United States Patent [19]

McKennon et al.

[11] Patent Number: 5,336,022
[45] Date of Patent: * Aug. 9, 1994

[54] METHOD FOR PRODUCING ENHANCED SOIL STABILIZATION REACTIONS BETWEEN LIME AND CLAY SOILS DUE TO THE EFFECT OF SILICA ADDITION

[75] Inventors: J. T. McKennon, Dallas; Norman L. Hains, Arlington; David C. Hoffman, Ft. Worth, all of Tex.

[73] Assignee: Chemical Lime Company, Fort Worth, Tex.

[*] Notice: The portion of the term of this patent subsequent to Jul. 20, 2010 has been disclaimed.

[21] Appl. No.: 943,940

[22] Filed: Sep. 11, 1992

Related U.S. Application Data

[63] Continuation-in-part of Ser. No. 800,630, Nov. 27, 1991, Pat. No. 5,228,808.

[51] Int. Cl.$^5$ .............................. C09K 17/00
[52] U.S. Cl. ........................ 405/263; 405/266; 106/706; 106/793; 106/796; 106/900
[58] Field of Search ............... 405/263, 266; 106/633, 106/681, 706, 718, 721, 793, 796, 812, 900

[56] References Cited

U.S. PATENT DOCUMENTS

| | | | |
|---|---|---|---|
| 2,916,853 | 12/1959 | Latourette et al. | |
| 3,635,742 | 1/1972 | Fujimasu | |
| 3,741,308 | 6/1973 | Veley | |
| 3,854,968 | 12/1974 | Minnick et al. | 106/710 |
| 3,861,930 | 1/1975 | Lin | 106/784 X |
| 4,188,231 | 2/1980 | Valore | 106/700 |
| 4,233,015 | 11/1980 | Teague et al. | 405/263 |
| 4,266,980 | 5/1981 | Chudo et al. | 106/715 X |
| 4,329,090 | 5/1982 | Teague et al. | 405/263 |
| 4,461,644 | 7/1984 | Childs et al. | 106/606 |
| 4,465,518 | 8/1984 | Miyoshi et al. | 106/71.5 |
| 4,496,267 | 1/1985 | Gnaedinger | 106/697 X |
| 5,122,012 | 6/1992 | Walker | 405/263 |
| 5,228,808 | 7/1993 | McKennon et al. | 405/263 |

FOREIGN PATENT DOCUMENTS

| | | |
|---|---|---|
| 56-143288 | 11/1981 | Japan |
| 61-87776 | 5/1986 | Japan |
| 61-91283 | 5/1986 | Japan |

*Primary Examiner*—Randolph A. Reese
*Assistant Examiner*—John Ricci
*Attorney, Agent, or Firm*—Charles D. Gunter, Jr.

[57] ABSTRACT

A method is shown for stabilizing clay bearing soils in which a silica compound is incorporated into the soils in addition to the application of lime. The silica compound can be either an amorphous, silica fume, a crystalline silica, a silica gel, sodium silicate, potassium silicate, finely ground glass or combinations thereof. The silica compound promotes the formation of calcium silicate hydrates over the formation of calcium aluminate hydrates in the resulting pozzolanic reaction occurring in the clay bearing soils. The silica compound and lime can be incorporated into the soils in a single step.

12 Claims, No Drawings

METHOD FOR PRODUCING ENHANCED SOIL STABILIZATION REACTIONS BETWEEN LIME AND CLAY SOILS DUE TO THE EFFECT OF SILICA ADDITION

BACKGROUND OF THE INVENTION

CROSS REFERENCE TO RELATED APPLICATIONS

The present application is a continuation-in-part of our earlier filed application serial no. 07/800,630, filed Nov. 27, 1991, entitled "Method For Preventing The Adverse Effects Of Swell In Sulfate Bearing, Expansive Clay Soils" now U.S. Pat. No. 5,228,808, by the same inventors.

FIELD OF THE INVENTION

The present invention relates generally to soil stabilization methods and to compositions for use therein and or specifically, to a method for improving the characteristics of clay bearing soils by treating with silica compounds in conjunction with lime stabilization.

DESCRIPTION OF THE PRIOR ART

For many years, calcined limestone in the form of hydrated lime, $Ca(OH)_2$ or quicklime, CaO, has been widely used as an additive to (1) stabilize highly plastic clay soils; (2) to prevent the shrinking and swelling characteristics of such soils and to (3) increase the load carrying ability of the treated soil. This system of treating clay bearing soils has been highly successful and economical, especially in the cases of highway and airport construction, and has been specified by most of the highway and transportation departments in the contiguous United States. In the past, subgrades have been improved as building sites, streets, runways, railroads, for remedial stabilization of existing structures, slope stabilization and for landfill stabilization, to list a few typical examples. Areas void in good, low plasticity, construction materials for building highways, airports, parking lots, building foundations and the like have fortuitously been found to have expansive clays, such as montmorillonite or kaolinite type clay soils, which can be economically and effectively treated with lime to provide base and sub-base soil of low plasticity and low water susceptibility. Lime and lime slurries have been worked into the top layers of such soils; for example, 6 to 36 inches in depth to improve and stabilize such soils or subgrades. Chemical soil stabilization by injection of lime slurry at predetermined depths below the soil surface is also known using freshly slaked quicklime or hydrated lime slurries.

Such lime-treated, base course layers build strength over time due to pozzolanic soil reactions. Strength development to over 2000 p.s.i. has been documented. These pozzolanic reactions, resulting from the combination of native silica and free alumina provided by the clay in a high pH environment, and lime which provides the calcium and high pH driving force, produce calcium silicate hydrates (CSH) and calcium aluminate hydrates (CAH)—the major strength-producing components. Of the two, the calcium silicate hydrates are the preferred of the strength-producing components.

Despite the previously mentioned advances achieved in lime-soil stabilization techniques, a need continues to exist for a method for improving the characteristics of soils or aggregate soil mixtures, by promoting the formation of calcium silicate hydrates over the formation of calcium aluminate hydrates in the resulting pozzolanic reaction occurring in pozzolanic soils during lime stabilization treatments and by promoting speed of this reaction.

A need exists for such a method which is simple and economical in practice and which is compatible with existing lime-soil stabilization techniques.

SUMMARY OF THE INVENTION

In the improved method for stabilizing clay bearing soils of the invention, a lime treatment is applied to the soils, the lime being applied in an amount effective to provide a driving force for promoting a pozzolanic reaction resulting from the combination of native silica and free alumina provided by the clay bearing soils, in a high pH environment enhanced by the lime application, with calcium donated by the lime. The resulting pozzolanic reaction produces calcium silicate hydrates and calcium aluminate hydrates as reaction products in the clay bearing soils. The pozzolanic reaction is enhanced by incorporating into the clay bearing soils an additional amount of silica over and above the amount of native silica present in the clay bearing soils, the additional amount of silica being added in a concentration effective to promote the formation of calcium silicate hydrates over the formation of calcium aluminate hydrates in the resulting pozzolanic reaction occurring in the clay bearing soils.

Preferably, the additional silica is added in the form of a conveniently available silica compound, the additional silica and the lime being incorporated into the soils in a single step. The silica compound can conveniently be selected from the group consisting of amorphous silica, crystalline silica or silica gel (sodium silicate or potassium silicate) and combinations thereof. The lime which is applied to the soils is preferably provided in the form of calcium hydroxide or quicklime convertible to calcium hydroxide in situ by the addition of copious amounts of water.

The silica compound can be conveniently provided in the form of silicon dioxide ($SiO_2$) and is preferably applied to the soils at an application rate of about 0.2 to 4% by weight based on the dry weight of one square yard at design depth of the clay bearing soil being treated. The silica is solubilized in the high pH environment provided by lime.

Additional objects, features and advantages will be apparent in the written description which follows.

DETAILED DESCRIPTION OF THE INVENTION

In spite of advances in lime (calcium hydroxide) soil stabilization techniques, it has been found that the addition of silica over and above the native silica present in clay bearing soils can promote the formation of calcium silicate hydrates (CSH) over the formation of calcium aluminate hydrates (CAH) in the pozzolanic reaction which occurs in clay bearing soils upon application of traditional lime stabilization treatments. The promotion of the calcium silicate hydrate portion of the CSH/CAH cementitious reactions (i.e., increasing the CSH to CAH ratio) by the addition of a silica compound to the clay bearing soils in question, in conjunction with a lime stabilization treatment, has several benefits which will be apparent in the description which follows. Silica addition appears to significantly improve the reactivity potential of clay bearing soils with the lime used in traditional lime stabilization techniques.

In the improved method for stabilizing clay bearing soils of the invention, a lime treatment is applied to the soils, the lime being applied in an amount effective to provide a driving force for promoting a pozzolanic reaction resulting from the combination of native silica and free alumina provided by the clay bearing soils, in a high pH environment enhanced by the lime application, with calcium donated by the lime. The resulting pozzolanic reaction produces calcium silicate hydrates and calcium aluminate hydrates as reaction products in the clay bearing soils.

The percentage of clay minerals present in a soil generally dictates the amount of lime required to stabilize the soil in a traditional lime stabilization treatment. Soils with a high clay content or an initial high plasticity index (PI) and swell, require greater amounts of lime to effectively reduce the plasticity, eliminate the swell, and stabilize the soil.

The type or types of clay present are also believed to be major factors in determining the strength and swell potential in lime stabilization. Smectites are three layered clays which are highly expansive. Thus a soil containing large amounts of smectite will require more lime to become stabilized. However, the two layered structure of kaolinite may allow it to be a greater source of free alumina needed for the formation of ettringite in sulfate bearing soils. Montmorillonite is a highly expansive smectite clay which can be treated according to the method of the present invention. The type or types of clays present in the soil have an important impact on the ultimate amount of lime required in lime stabilization treatment.

Lime will generally be added to the soil, for purposes of the present invention, in the range from about 1 to 10% by weight, based on the dry weight of one square yard at design depth of the clay bearing soil being treated and based on the plasticity index of the clay.

The lime which is applied to the soils is preferably provided in the form of calcium hydroxide or quicklime convertible to calcium hydroxide in situ by the addition of copious amounts of water.

The pozzolanic reaction which is initiated by the application of lime and moisture is enhanced by incorporating into the clay bearing soils an additional amount of silica over and above the amount of native silica present in the clay bearing soils. The additional amount of silica is added in a concentration effective to promote and speed up the formation of calcium silicate hydrates over the formation of calcium aluminate hydrates in the resulting pozzolanic reaction occurring in the clay bearing soils.

Preferably, the additional silica is added in the form of a conveniently available silica compound, the additional silica and the lime being incorporated into the soils in a single step. The silica compound can conveniently be selected from the group consisting of amorphous silica, crystalline silica (quartz sand), silica fume, Tripoli, silica gel (sodium silicate or potassium silicate), finely ground glass and combinations thereof. Tripoli is a naturally occurring, finely divided, porous, friable form of microcrystalline silica or quartz found in Alabama and Tennessee.

The silica compound is preferably a silica (silicon dioxide, $SiO_2$) selected from the group consisting of 300 amorphous silica, −200 mesh ground glass, silica "fume", −300 mesh crystalline silica, and silica gel. A preferred powdered silica is amorphous silica formed in burning rice hulls or sugar cane at controlled low temperatures. A typical commercially available product has an overall analysis of about 60% by weight silicon dioxide, about 35% by weight carbon, about 2% by weight trace metal contents and approximately 0.5% by weight moisture. Some silica containing compounds can also be utilized with some degree of effectiveness, as long as pozzolanic formation is not impeded, such as with some organic compounds. For instance, the silica compound can be crystalline silica in the form of ground or floured quartz sand (preferably 300 mesh or less). Unprocessed quartz sand is not sufficiently soluble to be effective for this invention.

The preferred application rate of the silica compound as a percentage of the clay soil being treated is in the range from about 0.2 to 6% by weight, preferably from about 0.3 to 3.0% by weight, most preferably about 0.5 to 1.5% by weight, based on the weight of one square yard at design depth of the clay bearing soils being treated. At a soil weight of 2,700 pounds per cubic yard, a square yard of lime treated subgrade 6 inches deep would require approximately 1.4 to 13.5 pounds of amorphous or powdered crystalline silica for the purposes of the present invention.

In practicing the method of the invention, it will be understood that the silica compound can be applied to the soils by combining the silica compound with a slurry of lime or by combining the dry compound with dry lime, at the time of lime production. Since dry silica can be mixed with and applied with the lime component, including the slurry form during the stabilization treatment, the extra cost of the present method involving silica addition is largely limited to the delivered cost of the silica and some blending in production. These economic factors and one step application make the method of the invention most efficient and economical as a remedial process in soil stabilization of expansive clays and problematic silty soils in construction.

One side effect of incorporating lime within sulfate bearing soils above 2000 ppm is that the lime provides calcium which reacts with the soluble sulfates, which may react with aluminum in an excess of water to form ettringite, an undesirable by-product. However, the fact that free and soluble aluminum are significantly reduced or depressed by the addition of silica in the present invention, and that calcium and silicon are increased, are strong indicators that the pozzolanic reaction product of calcium silicate hydrate, in lieu of the development of ettringite, is promoted. Thus silica addition has important benefits in reducing ettringite formation in clay soils having high soluble sulfate concentration. However, as will be apparent in the test results which follow, the present invention also has equal application and enhanced benefits in clay bearing soils which do not necessarily contain high concentrations of soluble sulfates.

TESTING PROGRAM

When lime is added to soil, four general reactions occur: cation exchange, flocculation-agglomeration, pozzolanization and carbonation. Of these reactions the most important single reaction in terms of permanent improvement of the clay soil is the pozzolanic reaction. In this reaction, the pH of the clay-water system is elevated to a point where the clay silica and clay alumina are liberated from the silica bearing tetrahedral sheets and the alumina bearing octahedral sheets, respectively. The reactions among the calcium, silica and water and calcium, aluminum and water are responsible to a large degree for the alteration of the clay from a plastic, high shrink-swell potential material to a low plasticity, stable material. This pozzolanic reaction is also responsible for the development of a cementitious binder which holds the particles together in a strong matrix.

In order for a pozzolanic reaction to occur in the high pH environment of the soil-water-lime solution, silica must be released. One way to evaluate the liberation of silica is to measure the silicon concentration in the aqueous phase of the mixture. This was done for samples produced from two sources of lime (hydrated and quicklime slurries), two clay soil types (calcium-saturated Beaumont clay and sodium-saturated Beaumont clay) and for two levels of silica enrichment (with the addition of 3.0% silica ash by weight of the soil and without addition of silica ash). The actual silica provided by the introduction of silica ash is only about 60% of the silica ash. Thus only about 1.8% silica by weight was added to the soil.

The addition of lime at the rate of 8% by weight of the dry soil did not produce measurable amounts of silicon in the aqueous phase of the mixtures where additional silica was not added. It is possible that the silicon released from the clay reacts at the clay surface to form calcium silicate hydrates and thus does not go into the aqueous solution. In any case, the addition of 1.8% silica results in a measurable level of silicon in the aqueous phase. These results are summarized in Table I below:

TABLE I

| Identification of Mixture | Concentration of Silicon in Aqueous Phase, ppm |
| --- | --- |
| HLS | 0.000000 |
| QLS | 0.000000 |
| HLS + 3% silica ash | 7.464375 |
| QLS + 3% silica ash | 12.321875 |

The abbreviation HLS stands for hydrated lime slurry, and the abbreviation QLS stands for quick lime slurry. The soil used was a Beaumont clay which was either sodium or calcium saturated (the results are pooled).

It will be noted from Table I that the source of lime has a significant influence on the level of silicon in solution. It has also been noted that the concentration of silicon also generally increases with time. It is theorized that the high concentration of silicon in the hydrated lime slurry mixture is due to the fact that the silicon reacts more slowly with the lime (and perhaps the clay surface) because the hydrated slurry is less reactive.

The above data show that the addition of silica produces a measurable silicon concentration in the aqueous phase and that there is a significant difference between the silicon concentration when the soil is treated with slurried hydrated lime than when the soil is treated with slurried quicklime.

The interactions of aluminum in solution were also investigated.

The aluminum in solution in the various mixtures is summarized in Table II below.

TABLE II

| Identification of Mixtures | Soluble Aluminum, ppm |
| --- | --- |
| HLS | 9.16 |
| QLS | 19.20 |
| HLS + 3% silica ash | 3.16 |

TABLE II-continued

| Identification of Mixtures | Soluble Aluminum, ppm |
| --- | --- |
| QLS + 3% silica ash | 2.38 |

The following conclusions can be drawn:

1. The amount of aluminum in solution is significantly affected by the addition of silicon in the form of silica ash. The addition of the ash reduces the aluminum in solution to very low levels, below about 4 ppm on the average. This reduction in soluble aluminum may be quite significant in the control of sulfate-induced heave in lime treated subgrades.

2. In the mixtures where no silica is added, the quicklime slurry—soil mixtures release considerably more aluminum into solution than do mixtures of soil and hydrated lime slurry. This is an indication of the substantially higher level of reactivity of the quicklime slurry. When silica is added to the mixtures, the level of soluble aluminum in the aqueous phase is substantially and significantly lower than for the mixtures without silica addition. The level of soluble aluminum in the aqueous phase of mixtures of hydrated slurry and quicklime slurry are not significantly different.

3. Not only does the addition of silica significantly reduce the level of soluble aluminum, but it also prevents a rapid increase or release of soluble aluminum with time which occurs in the case where no silica is added.

The relationships between soluble calcium and lime were also investigated. The data is summarized in Table III which follows:

TABLE III

| Identification of Mixture | Soluble Calcium, ppm |
| --- | --- |
| HLS | 476 |
| QLS | 518 |
| HLS + 3% silica ash | 794 |
| QLS + 3% silica ash | 878 |

It is clear that the level of soluble calcium is significantly increased with the addition of silica. Also, the level of calcium is higher in the quicklime slurry with silica than in the hydrated lime slurry with silica.

It has also been noted that the addition of silica to all mixtures significantly increases the level of mixture pH, especially at curing periods of 30 days and more. For example, the average increase in pH for the hydrated lime slurry upon the addition of silica is from 11.9 to 12.2 while the average increase in pH for the quicklime slurry upon the addition of silica is from 11.2 to 12.2. This information is summarized in Table IV which follows:

TABLE IV

| Identification of Mixture | pH Value |
| --- | --- |
| HLS | 11.50 |
| QLS | 11.64 |
| HLS + 3% silica ash | 12.11 |
| QLS + 3% silica ash | 12.13 |

The interaction between bicarbonate in solution and lime was also investigated. The level of bicarbonate is higher in solution in the mixtures where silica was added in the form of rice hull ash since these mixtures provided the higher levels of calcium in solution. It is important to note the levels of bicarbonate are statistically different in mixtures containing silica when compared to mixtures without silica. The fact that the bicarbonate levels are higher in the silica-treated mixtures may indicate a higher level of exchange site reactivity (replacement of calcium for sodium ions).

The above tests show that the addition of silica in the form of rice hull ash to both hydrated lime slurry and quicklime slurry significantly influences the concentration of certain elements and compounds in the aqueous fraction of the mixtures. The laboratory test results have important ramifications for treatment of soils having significant contents of expansive clays.

The Beaumont clay is a highly montmorillonitic clay yet it is quite non-reactive with lime in the sense that silicon is not readily solubilized from the clay surface. The addition of silica to the lime soil mixtures with the Beaumont clay apparently significantly improves the reactivity potential of this soil with lime. This determination has been made based on the soluble calcium, silicon and aluminum in the aqueous solution and on the pH of the solution.

The fact that the addition of silica in the form of rice hull ash improves the reactivity of the mixtures of lime and soil and the fact that the concentration of aluminum in the aqueous phase is much reduced when the silica is added to the mixtures indicates that the addition of silica may be an important additive for the control of the formation of deleterious products such as ettringite in sulfate bearing soils stabilized with lime or other calcium based stabilizers. Indications are that the Beaumont soil, due to its tendency to release aluminum in lieu of silicon in the high pH environment, is most probably a soil that would react adversely in a sulfate enriched environment when stabilized with lime. The fact that the soluble aluminum is significantly reduced by the addition of silica and that the calcium and silicon are increased is a strong indication that the pozzolanic reaction of calcium silicate hydrate in lieu of the development of ettringite is promoted.

X-ray diffraction (XRD) analysis also reinforces the above conclusions.

Both bulk and clay fraction (<0.002 mm) samples of the Beaumont clay were analyzed by XRD techniques. About 2 grams of the bulk sample was dried at 110° C. and ground in a disk mill grinder to produce a small uniform particle size. The ground samples were then pressed into a briquette at 50,000 psi to produce a compact disk suitable for analysis.

The clay fraction was isolated from the total sample by sedimentation fractionation. The clay fraction was saturated with magnesium, washed free of excess salts, and the dispersed sample placed onto ceramic tile or glass slides for XRD analysis. XRD analysis was performed using a Philips X-ray diffractometer with Cu radiation, a curved crystal monochrometer and theta compensating slit. The diffractograms were stored as digital data on a computer for subsequent output and analysis.

Analysis of the bulk samples before and following different levels of treatment with lime and silica did not show significant differences. Quartz and kaolinite were the minerals clearly identifiable in the bulk samples. Smectite was present only at low intensities in the bulk sample.

Analysis of the oriented clay fraction revealed a strong and well defined 15A diffraction peak which expanded to 18A with ethylene glycol solvation indicating the presence of smectite. Analysis of the clay fraction revealed significant differences when comparing natural clay with clay treated with quicklime slurry and quicklime slurry plus silica addition in the form of rice hull ash. The major differences consisted of a significant suppression of the smectite peak upon treatment with quicklime or quicklime plus silica and the presence of calcite in the treated clay fractions.

In order to further investigate the effects of secondary calcite either as a diluting factor or as causing poor orientation, the clay fraction (<0.002 mm) was treated with 0.05 M HCl. Although the pH of this solution was low, it was not felt that the acid treatment would have an adverse affect on the phyllosilicate minerals. After acid treatment, the clay fraction was again saturated with magnesium, washed free of excess salts and plated onto ceramic tile for X-ray diffraction analysis.

The acid treatment of the quicklime and quicklime and silica treated samples restored the smectite peak but not to the intensity found in the untreated samples. It is thus apparent that the quicklime and/or quicklime plus silica treatment did not alter the clay minerals uniformly. However, it is most likely that the quicklime and the quicklime plus silica treatment reacted with the clay mineral in the high pH environment to alter the surface of the phyllosilicates to produce calcium-silicate-hydrates and calcium-aluminate hydrates. These compounds have the potential to "cement" agglomerated portions of the clay mineral together forming a tight, cemented matrix resistant to shrink, swell, and consistency changes upon the addition of water and with considerable shear strength when compared to the natural, untreated material. This "cementitious coating" is probably the most consistent and plausible explanation of the decreased ability of the X-ray diffraction analysis to reveal the presence of the smectite mineral.

Based on a careful evaluation of the X-ray diffraction spectra, it can be determined that the clay fraction of the Beaumont soil is fine-grained and predominantly smectite with non-exchangeable acidity in the form of aluminum interlayers. The primary isomorphous substitution occurs in the tetrahedral sheet. The addition of quicklime slurry dramatically suppresses the smectite peak.

Acid treatment of quicklime-treated samples restores the smectite peak and restores the expansion potential upon ethylene glycol (EG) solvation. However, the full intensity of the smectite peak is not recovered (only about 64 percent of intensity is recovered). Treatment of the natural Beaumont clay with quicklime in a slurry form plus 3 percent silica ash virtually eradicates the smectite peak. The quicklime plus silica treatment is significantly more effective than is the quicklime treatment alone. Acid treatment restores the smectite peak of the quicklime and silica treated natural Beaumont clay. However, the peak intensity is only about 50 percent of that of the untreated clay and only about 78 percent of that of the natural Beaumont clay treated with quicklime slurry only.

An invention has been provided with several advantages. Treatment of clay bearing soils in accordance with the method of the invention is successful in preventing unwanted swell or expansion and in increasing bearing strengths of the soils tested. Lime, added to the silica treated soils, reduces swell pressures in volume change tests, keeping the swell in the "non-critical" range. The present method enhances the reactivity of the clay bearing soils with the lime provided by the stabilization treatment. The silica compound used in the treatment method of the invention is relatively inexpensive, available, and does not greatly increase the cost of the soil stabilization treatment.

The aqueous chemistry study and X-ray diffraction study demonstrate that an amorphous silica additive substantially enhances the pozzolanic reaction between the clay surface and the lime. The amorphous silica additive is potentially of value in "hard-to-stabilize" soils as well as in soils with high soluble sulfate levels. The use of silica in conjunction with lime in soil stabilization programs also allows silty soils to be treated. The term "silty soils" is intended to encompass silty clays, claying silts and silt bearing soils, such soils being characterized by an average particle size which is greater than clay and less than sand. These soils have traditionally been treated with other materials such as fly ash and Portland cements, due to their greater relative particle size and lower silica solubility.

While the invention has been shown in only one of its forms, it is not thus limited but is susceptible to various changes and modifications without departing from the spirit thereof.

What is claimed is:

1. An improved method for stabilizing clay bearing soils, comprising the steps of:

applying a lime treatment to the soils, the lime being applied in an amount effective to provide a driving force for promoting a pozzolanic reaction resulting from the combination of native silica and free alumina provided by the clay bearing soils in a high pH environment enhanced by the lime application with calcium donated by the lime, the resulting pozzolanic reaction producing calcium silicate hydrates and calcium aluminate hydrates;

further enhancing the pozzolanic reaction by incorporating into the soils an additional amount of silica over and above the amount of native silica present in the clay bearing soils, the additional amount of silica being added in a concentration effective to promote the formation of calcium silicate hydrates over the formation of calcium aluminate hydrates in the resulting pozzolanic reaction occurring in the clay bearing soils.

2. The method of claim 1, wherein the additional silica and the lime are incorporated into the soils in a single step.

3. The method of claim 2, wherein the additional silica which is incorporated into the clay bearing soils is provided in the form of a silica compound which is selected from the group consisting of amorphous silica, crystalline silica, Tripoli, silica gel, sodium silicate, potassium silicate, silica fume; finely ground glass and combinations thereof.

4. The method of claim 2, wherein the lime which is applied to the soils is provided in the form of calcium hydroxide.

5. The method of claim 2, wherein the lime which is applied to the soil is provided in the form of quicklime which is converted to calcium hydroxide in situ by the addition of water to the soils being treated.

6. An improved method for enhancing a lime stabilization treatment of clay bearing soils of the type having native silica and hydrates of alumina present therein, where such native silica and hydrates of alumina tend to combine with calcium donated by lime applied to the soils during the lime stabilization treatment in a chemical reaction to form calcium silicate hydrates and calcium aluminate hydrates, the improved method comprising the steps of:

incorporating into the soils in addition to a normal lime stabilization treatment an effective amount of a silica compound, the silica compound being present in an amount effective to depress the solubility of free aluminum in the clay bearing soils and thereby promote the formation of calcium silicate hydrates over the formation of calcium aluminate hydrates in a resulting pozzolanic reaction occurring in the clay bearing soils, whereby the reactivity potential of the clay bearing soils with the lime provided by the stabilization treatment is improved.

7. The method of claim 6, wherein the silica compound is incorporated into the soils in the range from about 0.2 to 4.0% by weight, based on the weight of one square yard of clay bearing soil at a design depth of 6 inches.

8. The method of claim 7, wherein the silica compound and the lime are incorporated into the soils in a single step.

9. The method of claim 8, wherein the silica compound is selected from the group consisting of amorphous silica, crystalline silica, silica gel, sodium silicate, potassium silicate, silica fume, finely ground glass and combinations thereof.

10. The method of claim 9, wherein the lime which is applied to the soils is provided in the form of calcium hydroxide.

11. The method of claim 10, wherein the lime is provided in the form of calcium hydroxide and wherein the silica compound is combined with the calcium hydroxide to form a lime slurry, the slurry then being applied to the clay bearing soils in order to stabilize the clay bearing soils.

12. An improved method for stabilizing clay and silt bearing soils, such soils being characterized by an average particle size greater than clay and less than sand, the method comprising the steps of:

applying a lime treatment to the clay and silt bearing soils, the lime being applied in an amount effective to provide a driving force for promoting a pozzolanic reaction resulting from the combination of native silica and free alumina provided by the clay and silt bearing soils in a high pH environment enhanced by the lime application with calcium donated by the lime, the resulting pozzolanic reaction producing calcium silicate hydrates and calcium aluminate hydrates;

further enhancing the pozzolanic reaction by incorporating into the silt bearing soils an additional amount of silica over and above the amount of native silica present in the silt bearing soils, the additional amount of silica being added in a concentration effective to promote the formation of calcium silicate hydrates over the formation of calcium aluminate hydrates in the resulting pozzolanic reaction occurring in the silt bearing soils.

* * * * *